(12) United States Patent
Do

(10) Patent No.: US 6,275,709 B1
(45) Date of Patent: Aug. 14, 2001

(54) ARRANGEMENT FOR IMPROVING AVAILABILITY OF SERVICES IN A COMMUNICATION SYSTEM

(75) Inventor: Thanh Van Do, Oslo (NO)

(73) Assignee: Telefonaktiebolaget LM Ericsson, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,218
(22) Filed: Oct. 5, 1999

Related U.S. Application Data

(63) Continuation of application No. PCT/NO98/00106, filed on Apr. 2, 1998.

(30) Foreign Application Priority Data

Apr. 8, 1997 (NO) .................................................. 971605

(51) Int. Cl.[7] ...................................................... H04Q 7/20
(52) U.S. Cl. ........................... 455/461; 455/456; 455/560
(58) Field of Search .................................. 455/461, 403, 455/422, 445, 435, 560, 456; 707/109; 709/203, 218; 370/310, 328

(56) References Cited

U.S. PATENT DOCUMENTS

| H1837 | * | 2/2000 | Fletcher et al. ...................... 455/433 |
| 5,765,108 | * | 6/1998 | Martin et al. ......................... 455/422 |
| 5,825,759 | * | 10/1998 | Liu ....................................... 370/331 |
| 5,850,444 | * | 12/1998 | Rune ..................................... 380/247 |
| 5,890,064 | * | 3/1999 | Widergen et al. .................... 455/445 |
| 5,914,668 | * | 6/1999 | Chavez, Jr. et al. ............. 340/825.44 |
| 5,956,637 | * | 9/1999 | Ericsson et al. ..................... 455/414 |
| 5,974,331 | * | 10/1999 | Cook et al. .......................... 455/461 |
| 5,978,672 | * | 11/1999 | Hartmaier et al. ................... 455/413 |
| 6,052,589 | * | 4/2000 | Persson et al. ...................... 455/433 |

FOREIGN PATENT DOCUMENTS

| 0 524 077 A1 | 1/1993 | (EP) . |
| 96/35611 A2 | 12/1995 | (WO) . |

OTHER PUBLICATIONS

Nofal et al, "A Simulation Study of Generic Broadband Wireless Integrated Networks", IEEE Symposium on Personal, Indoor, and Mobile Radio Communications, vol. 1, Oct. 18, 1996, pp. 168–172.*

Do et al, "Making Mobility Transparent to the Applications", IEEE 46th Vehicular Technology Conference, vol. 3, May 1, 1996, pp. 1825–1829.*

"The Common Object Request Broker: Architecture and Specification", Revision 2.0, Jul. 1995.

*Proceedings of the Thirtieth Annual Hawaii International Conference*, vol. 1, Jan. 1997, M. Khayrat Durmosch et al., pp. 92–99, "The Tanagram DPE—A Distributed Processing Environment in a Hexerogeneous Corba 2 World".

* cited by examiner

*Primary Examiner*—Nay Maung
(74) *Attorney, Agent, or Firm*—Nixon & Vanderhye P.C.

(57) ABSTRACT

The present invention relates to an arrangement for improving availability of services in a communication system, especially a telecommunication system, said system comprising distributed hardware and software components which interact in order to provide services to one or more users, and in order to facilitate the designer's tool when preparing such communications systems for enhanced mobility, it is according to the present invention suggested an improvement by introducing in said system a Generic Mobility System, for thereby enabling facilitated application design including inter alia terminal or personal mobility. More specifically the present invention suggests that a module of package called Generic Mobility System is introduced to give such mobility support in distributed system.

15 Claims, 1 Drawing Sheet

ARRANGEMENT FOR IMPROVING AVAILABILITY OF SERVICES IN A COMMUNICATION SYSTEM

Figure 1:
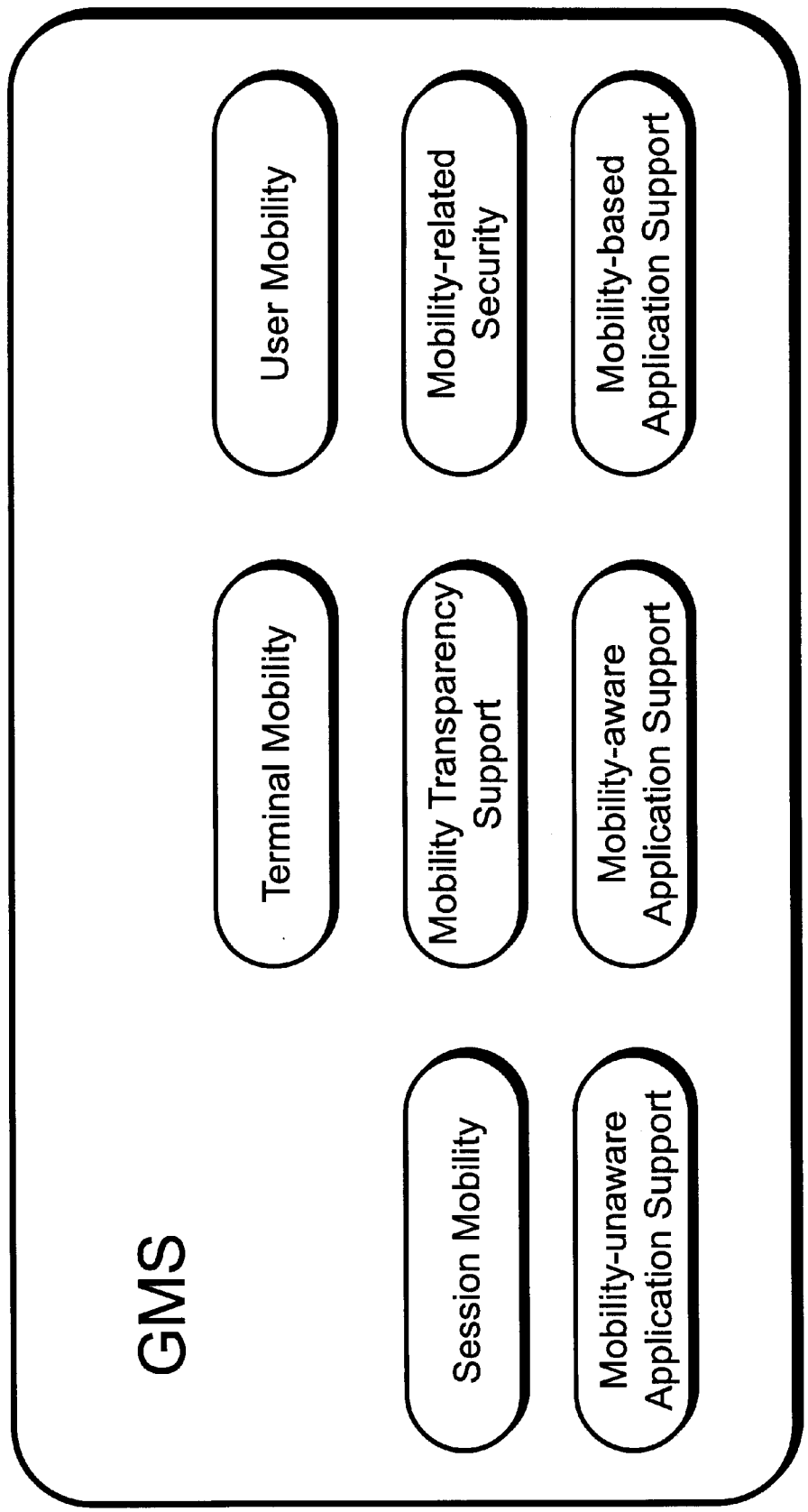

This application is a continuation of Ser. No. PCT/N098/00106 filed Apr. 2, 1998.

FIELD OF THE INVENTION

The present invention relates to an arrangement for improving availability of services in a communication system, especially a telecommunication system, said system comprising distributed hardware and software components which interact in order to provide services to one or more users.

BACKGROUND OF THE INVENTION

The rapid expansion of digital cellular telephone expresses an urgent demand for mobility from the users and the necessity of the mobility support for telecommunication systems. Both ODP and TINA-C define the mobility support as an important requirement. However, both ODP and TINA-C assume in their original framework that the support of mobility is considered as a consequence of the support of the other distribution transparencies and, therefore, does not require any additional functions and mechanisms in the Distributed Processing Environment (DPE).

The present invention has been developed on the basis that access and location transparencies are not sufficient for supporting terminal and personal mobility. The main development of the present invention is based on considering mobility as an additional transparency and in order to do so there is according to the present invention proposed a Functional Separation Architecture wherein the mobility functions are separated from the network layer and the application (service) layer and grouped into a separate layer called the mobility layer.

The present invention has for its main object to suggest an implementation of realising such mobility layers, especially in connection with a so-called Generic Mobility System (GMS), whereby such a GMS will be designed and then introduced in the architecture transparency, i.e. applications although supported by the GMS are not aware of its existence.

STATE OF THE ART

The existing development environments and platforms for distributed systems such as for example CORBA [Objb] do not address mobility. In order to design mobile applications, i.e. applications that are available for mobile users, the application designer must consider, design and implement all the necessary mobility functions. This is avoided by using the GMS.

PROBLEMS RELATED TO PRIOR ART

The design and implementation of mobile applications are quite difficult since the application must deal with the mechanisms and function related to mobility which are complex, numerous and also time-consuming to implement. Further, the implementation of mobility functions by different persons for different applications at different places may lead to conflict and unwanted interactions.

On the other hand, quite a lot of efforts are required to make existing fixed-applications mobile.

OBJECTS OF THE PRESENT INVENTION

An object of the present invention is to propose a Generic Mobility System incorporating all the mechanisms and functions necessary to support mobility.

SUMMARY OF THE INVENTION

The above objects are achieved in an arrangement as stated in the preamble which according to the present invention is characterised by the features as stated herein and specifically n the enclosed patent claims.

Further features and advantages of the present invention will appear from the following description taken in conjunction with the appending drawing.

BRIEF DISCLOSURE OF THE DRAWING

FIG. 1 is a schematical diagram illustrating an embodiment of the present invention, especially the Generic Mobility System and its functions.

DESCRIPTION OF EMBODIMENTS

This invention consists of a Generic Mobility System (GMS) which provides all the mobility support functionality for any type of networks and distributed systems.

The GMS encapsulates all the functions needed to support mobility, i.e. all the processing and data management necessary to support the mobility of the users and terminals are taken care of by the GMS.

The GMS is generic in the sense that it is applicable to all the telecommunications systems. The flavour of the wanted mobility can be combined and configured at installation. A telecommunications system, public or private, can choose, adopt, customise and instantiate every component of the GMS to obtain a mobility system supporting the type of mobility required. One instance of the GMS may for instance support only discrete terminal mobility suitable for a DECT system while another instance may support all types of mobility, i.e. terminal, user and session mobility. The service applications of the telecommunications system can then in turn choose and subscribe to the services of the mobility system.

The GMS can be implemented as a middleware, i.e. off-the-shelf software which can be purchased and installed in any distributed system such as CORBA-based (Common Request Broker Architecture) systems [Objb] to support mobility.

A more specific embodiment of such a Generic Mobility System (GMS) will now be described in detail reference being had to the enclosed FIG. 1.

As shown in FIG. 1 the Generic Mobility System will have the following fundamental functions:

Terminal Mobility comprising functions and mechanisms to support terminal mobility at object communication level.

User Mobility comprising functions and mechanisms to support user mobility at object communication level.

Mobility Transparency Support comprising functions and mechanisms to make mobility transparent at object communication level.

Mobility-related Security comprising functions and mechanisms to handle the mobility-related security issues.

Mobility-unaware Application Support comprising functions and mechanisms to support and make mobility transparent to the application considered an entire unit of activity.

Session Mobility comprises functions and mechanisms to support session mobility.

Mobility-aware Application Support comprising functions and services offered to the mobility-aware applications.

Mobility-based Application Support comprising functions and services offered to the mobility-based applications.

It is important to emphasise that the given overview of the GMS shows only a classification of the GMS functions. It is not a decomposition of the GMS into groups of objects.

Merits of the Invention

The GMS will alleviate the design and implementation of mobile applications and allow fixed-applications to be mobile without modification.

The GMS addresses a wide range of communications systems, public or private, local-area or wide-area, wire-line or wireless.

The GMS can be customised to support any combination of mobility, such ad discrete terminal mobility, personal mobility, session mobility, etc.

The GMS can run in any existing distributed platforms such as CORBA, JAVA, etc.

Important Features of the Present Invention

Important features of the present invention are as listed in the following:

A module or package called Generic Mobility System is introduced to give mobility support in distributed system.

Such a GMS contains the following mobility support functions: terminal mobility support functions, user mobility support functions, session mobility functions, mobility transparency support functions, mobility-related security functions, mobility-unaware application support functions, mobility-aware application support functions, mobility-based application support functions.

Such a GMS offers the possibility to choose, select, customise and combine any of the mentioned functions as desired.

Such a GMS can be installed and used in any type of communication system, public or private, local-area or wide-area, wireline or wireless.

Such a GMS can be implemented as middleware, i.e. off-the-shelf software which can be purchased and installed in any distributed environment and platform such as CORBA-based (Common Request Broker Architecture) systems [Objb].

References

[Objb] Object Management Group, Inc. The Common Object Request Broker: Architecture and Specification. Revision 2.0, July 1995.

What is claimed is:

1. Arrangement for improving availability of services in a telecommunication system, said arrangement comprising:
   distributed hardware and software components which interact in order to provide services to one or more users through terminals connected to said telecommunication system through network access point(s), said distributed hardware and software components including a Generic Mobility System (GMS) processing and managing data necessary to support mobility for said terminal(s) and user(s);
   wherein the GMS comprises the following mobility support functions;
   terminal mobility functions keeping track of which network access point each terminal is connected to at any time, for allowing the terminals to change locations while still being capable of requesting outgoing services or receiving incoming ones;
   user mobility functions allowing the user(s) to utilize different terminals including means for user registration and informing the system of which terminal(s) the user(s) is/are utilizing;
   session mobility functions allowing a session or sessions, being used by the user(s), to follow the user(s) independently of the location of the user(s), the terminal(s) or the access point(s) utilized by the user(s), said session mobility functions including registration of the user(s), said session(s) and the terminal(s) the user(s) is using;
   mobility transparency support functions making all mobility support functions transparent to all applications of the system;
   mobility-related security functions providing protection against abuse or unauthorized use of both the terminal (s), the telecommunication system and the services, including access control thereto and identification and authentication of the user(s);
   mobility-unaware application support functions making ordinary applications and services not adjusted for mobility available for the user(s) at anytime from any of the terminals and access points;
   mobility-aware application support functions allowing mobility-aware application including registration and collection of mobility information to be implemented, and
   mobility-based application support functions keeping track of positions of the terminal(s) at any time.

2. Arrangement as claimed in claim 1, wherein the terminal mobility support functions comprises functions and mechanisms to support terminal mobility at an object communication level.

3. Arrangement as claimed in claim 2, wherein the user mobility support functions comprises functions and mechanisms to support user mobility at an object communication level.

4. Arrangement as claimed in claim 3, wherein the mobility transparency support functions comprises functions and mechanisms to make mobility transparent at an object communication level.

5. Arrangement as claimed in claim 4, wherein the mobility-related security functions comprises functions and mechanisms to handle mobility-related security issues.

6. Arrangement as claimed in claim 5, wherein the mobility-unaware application comprises functions and mechanisms to support and make mobility transparent to an application considered as an entire unit of activity.

7. Arrangement as claimed in claim 4, wherein the mobility-aware application support functions comprises functions and services offered to mobility-aware applications.

8. Arrangement as claimed in claim 7, wherein the mobility based application support functions comprises functions and services offered to the mobility-based applications.

9. Arrangement as claimed in claim 8, wherein the session mobility support functions comprises functions to support session mobility.

10. Arrangement as claimed in claim 1, further including means to choose, select, customize and combine any of the mobility functions as desired.

11. Arrangement as claimed in claim 10, wherein the GMS can be installed and used in any type of communication system, public or private, local area or wide area, wireline or wireless.

12. The arrangement of claim 1, further including means for separating the recited mobility functions from certain other functions in a manner such that the GMS may be installed in a network system which does not originally support mobility thereby allowing such network system to thereafter support mobile systems following installation of the GMS.

13. The arrangement of claim 1, wherein the recited mobility functions are separated from a network layer and an application layer, and are grouped into a separate layer referred to as a mobility layer.

14. A mobility arrangement in a telecommunications system, the mobility arrangement comprising:

distributed hardware and software for providing services to one or more users;

a Generic Mobility System (GMS) for providing terminal or personal mobility services, the GMS comprising the following mobility support functions: terminal mobility support function, user mobility support function, session mobility function, mobility transparency support function, mobility-related security function, mobility-unaware application support function, mobility-aware application support function, and mobility-based application support function;

wherein the session mobility function allows a session(s) being used by the user(s) to follow the user(s) independently of the location of the user(s), the terminal(s) and the access point(s) utilized by the user(s), and wherein said session mobility function includes registration of the user(s), said session(s) and the terminal(s) the user(s) is using; and wherein said mobility support functions are separated from a network layer and an application layer and are grouped into a separate layer referred to as a mobility layer.

15. The mobility arrangement of claim 14, wherein said mobility support functions are separated from other functions in network and application layers in a manner such that the GMS may be installed in a network system which does not originally support mobility, in order to enable such system to support mobility after installation of the GMS.

* * * * *